United States Patent [19]

Sethi et al.

[11] Patent Number: 4,539,196
[45] Date of Patent: Sep. 3, 1985

[54] PROCESS FOR HYDROGENATING AN ALKYLATED ANTHRAQUINONE

[75] Inventors: Dalbir S. Sethi, Cranbury; Morton Meadow, Trenton, both of N.J.; Elizabeth A. Scarito nee Bagnall, Severna Park, Md.

[73] Assignee: FMC Corporation, Philadelphia, Pa.

[21] Appl. No.: 601,823

[22] Filed: Apr. 19, 1984

[51] Int. Cl.$^3$ .............................................. C01B 15/02
[52] U.S. Cl. .................................................... 423/588
[58] Field of Search ........................ 423/588, 589, 590

[56] References Cited

U.S. PATENT DOCUMENTS

| | | | |
|---|---|---|---|
| 2,158,525 | 5/1939 | Reidl et al. | 423/590 |
| 2,495,229 | 1/1950 | Dawsey et al. | 260/369 |
| 2,657,980 | 11/1953 | Sprauer | 23/207 |
| 2,673,140 | 3/1954 | Sprauer | 23/207 |
| 2,739,042 | 3/1956 | Corey et al. | 23/207 |
| 2,867,507 | 1/1959 | Gleason, Jr. et al. | 23/207 |
| 2,914,382 | 11/1959 | Holmes et al. | 23/207 |
| 2,930,803 | 3/1960 | Holmes et al. | 260/369 |
| 3,009,782 | 11/1961 | Porter | 23/207 |
| 3,030,186 | 4/1962 | Kreuz et al. | 23/207 |
| 3,041,143 | 6/1962 | Dawsey | 23/207 |
| 3,062,622 | 11/1962 | Darbee et al. | 23/207 |
| 3,073,680 | 1/1963 | Jenney et al. | 423/588 |
| 3,132,001 | 5/1964 | Denaeyer et al. | 23/207 |
| 3,307,909 | 3/1967 | Reilly | 23/207 |
| 3,330,625 | 7/1967 | Baker et al. | 23/207 |
| 3,540,847 | 11/1970 | Logan | 23/207 |
| 3,565,581 | 2/1971 | Lee | 23/207 |
| 3,615,207 | 10/1971 | Lee | 23/207 |
| 3,755,552 | 8/1973 | Lee et al. | 423/588 |
| 3,767,779 | 10/1973 | Coingt | 423/588 |
| 3,887,490 | 6/1975 | Schreyer et al. | 252/414 |
| 3,965,251 | 6/1976 | Shin et al. | 423/588 |

FOREIGN PATENT DOCUMENTS 62559 10/1982 European Pat. Off. ............ 423/588
1390408 7/1972 United Kingdom .

OTHER PUBLICATIONS

Kirk-Othmer, Encyclopedia of Chemical Technology, vol. 13, 3rd Edition, New York: John Wiley & Sons, 1981, pp. 16 to 21.
Winnacker-Küchler, Chemische Technologie, Band 2, Anorganische Technologie I, 4 Auflage, Carl Hanser, Munich, 1982, pp. 567–579.
Braun, J., and Bayer, O., "Katalytische Hydrierungen unter Druck by Genenwart von Nickelsalzen, IX," Berichte, 58, pp. 2667–2685, (1925).
T. Berglin & N. Schöön, "Kinetics and Mass Transfer Aspects of the Hydrogenation Stage of the Anthraquinone Process for Hydrogen Peroxide Production," *Ind. Eng. Chem. Process Des. Dev.*, 1981, 20, pp. 615–621.
T. Berglin & N. Schöön, "Selectivity Aspects of the Hydrogenation Stage of the Anthraquinone Process for Hydrogen Peroxide Production," *Ind. Eng. Chem. Process Des. Dev.*, 1983, 22, pp. 150–153.

*Primary Examiner*—John Doll
*Assistant Examiner*—Wayne A. Langel
*Attorney, Agent, or Firm*—Richard E. Elden; Eugene G. Horsky

[57] ABSTRACT

The invention provides a process to increase the mol ratio of nuclearly hydrogenated working compound to the total working solution for the production of hydrogen peroxide by the cyclic reduction, oxidation, and extraction of an alkylated anthraquinone. The process produces the nuclearly hydrogenated working compound without producing substantial quantities of undesired by-products.

20 Claims, No Drawings

PROCESS FOR HYDROGENATING AN ALKYLATED ANTHRAQUINONE

This invention is directed to an economical process for hydrogenating a 2-alkylanthraquinone to form the 5,6,7,8-tetrahydro derivative without simultaneously producing substantial quantities of undesired by-products and to a process for producing hydrogen peroxide using said tetrahydro compound.

U.S. Pat. No. 2,158,525 to Riedl et al teaches that on oxidation polynuclear organic hydroquinones are capable of forming hydrogen peroxide and the corresponding quinones. At the present time almost all of the commercial hydrogen peroxide is produced by the anthraquinone process which includes the steps of cyclically hydrogenating a "working" solution containing a 2-alkylanthraquinone to form the corresponding 2-anthrahydroquinone and oxidizing the latter to form the 2-alkylanthraquinone and hydrogen peroxide. The polynuclear hydroquinone and quinone compounds capable of forming hydrogen peroxide in such a process are called "working compounds". The working compounds presently known to be in use commercially are 2-ethylanthraquinone, 2-t-butylanthraquinone, 2-amylanthraquinone (usually the mixed sec and tert amyl compounds) and derivatives thereof. During the hydrogenation step some of the anthraquinone is nuclearly hydrogenated to form the 5,6,7,8-tetrahydro derivative, commonly abbreviated to "tetrahydro" or "tetra"; the tetra derivatives are also capable of producing hydrogen peroxide and are also considered to be working compounds.

Many other by-products are also formed in the working solution; these by-products are undesirable as they do not contribute to the production of hydrogen peroxide. Therefore, the presence of such other by-products is economically undesirable as they represent a loss of the expensive working compound.

The optimum operating condition for an anthraquinone process hydrogen peroxide plant is related to the quantity of hydrogen peroxide produced per cycle and the time required to complete such a cycle. The presence of a tetrahydro working compound in the working solution is one of the important factors to be considered in establishing the optimum operating conditions for a plant.

U. S. Pat. No. 3,073,680 to Jenney et al teaches that it is desirable if at least 85% of the working compound is in the tetrahydro form. The Jenney et al '680 patent is incorporated herein by reference in its entirety. The Jenney et al patent teaches that 2-ethyl-5,6,7,8-tetrahydroanthrahydroquinone can be produced by the hydrogenation of the 2-ethylanthraquinone at 50° C. and 340 kPa. However, the working solution of the reference initially contained 8.4 g/l of a working compound of which 64% was 2-ethylanthraquinone and 36% was 2-ethyl-5,6,7,8-tetrahydroanthraquinone. After 7 hours of hydrogenation 4.7 g/l working compound remained and all was in the tetrahydro form representing approximately a 40% yield based on the original working compound.

U. S. Pat. No. 2,495,229 to Dawsey et al teaches a process to produce a tetrahydroanthrahydroquinone in glass apparatus in approximately 85% yield. However, the Dawsey et al process requires a special porous nickel catalyst not suitable for use in a peroxygen process.

British Pat. No. 1,390,408 teaches a process for manufacturing hydrogen peroxide using a working solution containing 2-tert-amyltetrahydroanthraquinone and 2-sec-isoamyltetrahydroanthraquinone. The tetrahydroanthraquinones are first prepared by the process of U.S. Pat. No. 2,495,229 using a porous nickel catalyst at atmospheric pressure and elevated temperatures. The process of British Pat. No. 1,390,408 has the disadvantage of requiring a preliminary hydrogenation step to prepare the tetrahydroanthraquinone. Subsequently, the tetrahydroanthraquinones are isolated and a second, different hydrogenation step is necessary to form the 2-amyltetrahydroanthrahydroquinone in the working solution. It is more desirable economically to synthesize the tetrahydroanthrahydroquinone in the solvent to be used in the working solution and using the plant's hydrogenation equipment.

It is known that the tetrahydro component of a working compound increases gradually with time. However, during this time period other by-products are formed which degrade the working compound in the working solution. In addition, the productivity of a plant is depressed during the time period in which the tetrahydro component is forming in the working solution. It may take up to a year before the productivity, based on the working solution and the catalyst, reaches the design level. This delay in attaining the design productivity represents a significant economic loss.

It is desirable to develop a rapid process to increase the ratio of the tetrahydro component of the working compound to the total working compound without producing substantial quantities of undesired by-products, and without depressing the productivity of the catalyst or working solution. It is particularly desirable to develop a process capable of producing the tetrahydro compound using the same equipment and catalyst as is used to hydrogenate the working solution in the plant.

A process has been developed in which the ratio of the tetrahydro component of a working compound to the total working compound can be increased without forming substantial quantities of undesired by-products and using the same catalyst and type of equipment as is used in the hydrogenation step of a hydrogen peroxide manufacturing process. The process comprises adjusting the concentration of a solution of the working compound so that the concentration of the non-nuclearly hydrogenated anthraquinone of the working compound is no greater than the saturation concentration of the corresponding anthrahydroquinone formed in the subsequent hydrogenation step. The working solution is then hydrogenated at 50° C. or less in the presence of a palladium catalyst, whereby the ratio of tetrahydrogenated working compound to the total working compound is increased without substantial formation of undesired by-products.

The working compound may be based on any 2-alkylanthraquinone compound suitable for use in producing hydrogen peroxide by a cyclic hydrogenation and oxidation process. It is desirable that the 2-alkylanthraquinone working compound be selected from the group consisting of, 2-ethylanthraquinone, 2-t-butylanthraquinone, and 2-amylanthraquinone.

The working compound can be dissolved in any inert solvent. It is desirable for the inert solvent to be a component of a working solution to be used in the hydrogen peroxide process. It is preferable that the solution of the working compound produced by this invention is suitable for addition directly to a process stream of a plant producing hydrogen peroxide by the cyclic hydrogenation and oxidation of an alkylated anthraquinone.

It is well known that in the manufacture of hydrogen peroxide, a palladium catalyst is preferred over a nickel catalyst for hydrogenating the working compound to the anthrahydroquinone form because it is less likely to cause nuclear hydrogenation. It is surprising to find that a palladium catalyst is suitable to catalyze the hydrogenation of the non-nuclearly hydrogenated form of the working compound to the tetrahydro form of the working compound. This is critical for the economics of the present invention in that it is not necessary to use a first catalyst to prepare the tetrahydro form of the working compound and a second catalyst for the reduction of the quinone form to the hydrogenating form of the working compound. An additional advantage of the present invention is that the same hydrogenator can be used both to prepare the tetrahydro working compound and to reduce the quinones in the hydrogen peroxide manufacturing process to the corresponding hydroquinones. It is particularly desirable during the start-up phase of a plant to be able to hydrogenate the working compound to the tetrahydro form in the same hydrogenator that will be used later in the hydrogenation process.

Although the hydrogenator may be operated on 100% recycle of the working solution until the desired ratio of the tetrahydro working compound to the total working compound is obtained, it is also possible to operate with only part of the working solution passing through the oxidizer and extractor cycle. For safety reasons and economics, it is undesirable to circulate the hydrogenated solution through the rest of a plant without the oxidizer and extractor cycles in operation. By maintaining a recycle of at least 90% of the solution through the hydrogenator the depth of hydrogenation is increased to permit substantial formation of the tetrahydro working compound within the hydrogenator. At the same time, the 10% or less of the working solution can be oxidized and the hydrogen peroxide extracted, thereby eliminating the need to blanket the rest of the plant with an inert gas as a safety precaution. It is critical to this process that at least 90% and preferable if at least 95% of the hydrogenated working solution is recycled to the hydrogenator until the desired ratio is reached to minimize the production of undesired by-products. It is not critical whether the hydrogenator is either a fixed bed hydrogenator or a fluid bed hydrogenator.

It is also critical for the practice of this invention that the temperature of the hydrogenator be maintained at less than about 50° C. to prevent substantial formation of undesired by-products. Although temperatures of less than 40° C. are not objectionable with regard to the formation of undesired by-products, it is clear that such lower temperatures reduce both the hydrogenation rate and the solubility of the working compound. Therefore, the preferred operating temperature is between about 40° C. and about 50° C.

The pressure of the hydrogen gas in the hydrogenator is not critical over the range of about 50 to about 400 kPa. One skilled in the art will recognize that increasing the pressure will increase the rate of hydrogenation. However, within the above range there is little effect of pressure on the rate of formation of undesired impurities. Preferably, the hydrogen pressure will range between 100 and 200 kPa to minimize safety hazards and optimize equipment cost.

Additional non-nuclearly hydrogenated working compound may be added to the working solution during the hydrogenation to increase the concentration of the working compound to the design level. The additional working compound may be added in one or several increments providing the total concentration of the non-nuclearly hydrogenated working compound does not exceed the saturation concentration of the hydroquinone form in the hydrogenator.

The following non-limiting examples illustrate to one skilled in the art the best mode for practicing the claimed invention.

EXAMPLES

A hydrogenation pilot was designed to permit control of flow rate of solution, solution temperature, pressure, and gas flow rate. The palladium catalyst taught in U.S. Pat. No. 3,635,841 was used in a filed bed configuration to eliminate catalyst attrition with time and to eliminate filtration problems. Suitable sampling ports were provided. The quinone form of the working compound was dissolved in a suitable solvent and the system was purged of air using nitrogen. When the desired temperature was attained, the nitrogen was vented and replaced with hydrogen which was fed to the system at a preset pressure. Flow rates of the quinone solution and gas purge were adjusted and the hydrogenation allowed to proceed. Periodically, samples were withdrawn from the solution reservoir through a sampling valve and filter, oxidized, and extracted with 10% $H_2SO_4$, and analyzed by gas chromatograph to determine content of the 2-alkyl-5,6,7,8-tetrahydroanthraquinone and its parent quinone.

COMPARATIVE EXAMPLE

A working solution was prepared consisting of 25% by weight 2-amylanthraquinone (AAQ) in a mixed solvent, 67% diisobutylcarbinol (DIBC) and 33% $C_9$-$C_{12}$ aromatic hydrocarbon solvent (Shell Sol or merely SSol). The hydrogenator was charged with 324 g of the catalyst disclosed in U.S. Pat. No. 3,635,841 and operated at 50° C. hydrogenator inlet temperature to remove inherent poisons from the working solution. A rapid decline in the titers (78 to 53) was noticed during the first two days of operation. The catalyst bed was replaced with 324 g of fresh catalyst and the operation restarted. A similar decline in the titers was again observed. Heating the catalyst bed under a high purge of $N_2$ did not improve the titers. After 24 hours of operation, the catalyst was replaced with 534 g of fresh catalyst and operations were resumed. At the end of the third day, an additional 116 g of fresh catalyst was charged, bringing the total catalyst weight to 650 g. The operation was resumed at about 45° C. at the hydrogenator inlet temperature. A rapid decline was observed in the titers from 173 to 118. The catalyst bed was subsequently heated to about 100° C. with a purge of nitrogen through the bed to eliminate water from the catalyst bed. At this point, the working solution was assumed to be free from poisons and suitable for use to obtain meaningful data. Continuous operation was begun at a 45° C. hydrogenator inlet temperature. The titers were observed to drop from 126 to 106, in approximately 40 hours. The catalyst bed was regenerated with nitrogen for two hours and the operation restarted. During 52 hours of operation the titers gradually dropped from 128 to 101. This repeated decline in the titers was attributed to an impurity coating the catalyst bed. The operation was interrupted and the catalyst bed was washed with the mixed solvent in an effort to remove the suspected impurities from the catalyst bed. Following the washing of the catalyst bed, round-the-clock operation at 45° C. hydrogenator inlet temperature was restarted, the downward trend of the titers continued during the subsequent 70 hours of continuous operation.

EXAMPLE 1

The hydrogenator pilot was operated with a solution containing 1,600 g of a 6% solution of 2-ethylanthraquinone in a solvent containing 27% trioctyl phosphate and 73% SSol solvent system. After the system was thoroughly purged with nitrogen, hydrogenation was begun at 45° C. and 375 kPa of hydrogen. After 20 hours of hydrogenation, the concentration of 5,6,7,8-tetrahydro-2-ethylanthrahydroquinone was observed to be 4 weight percent, at which point additional 2-ethylanthraquinone was added to bring the total working compound concentration up to 9%. After an additional 8 hours of hydrogenation, the concentration of the tetrahydro derivative had reached 6.25%. No unwanted by-products were observed.

EXAMPLE 2

The equipment of Example 1 was operated under the same conditions as in Example 1, but instead contained a 15% solution of 2-amylanthraquinone in a $C_9$ aliphatic alcohol-SSol solvent mixture. After 11 hours, the concentration of the tetrahydro derivative had increased to 4.6%. Additional 2-amylanthraquinone was added to bring the solids concentration up to 20% percent. Hydrogenation was continued for an additional 16 hours at which point the concentration of the tetrahydro working compound ($H_4AAQ$) was 8.2%. An additional portion of 2-amylanthraquinone was added to bring the concentration of solid to 25%, and after 19 additional hours of hydrogenation, the level of tetrahydro working compound was 12.3%. Under the mild conditions, no unwanted by-product formation was detected.

EXAMPLE 3

Example 1 was repeated with 210 g of catalyst and 15 liters of a 16% AAQ solution in the DIBC-SSol solvent system. The hydrogenation inlet temperature ranged from 40° C. and the pressure ranged from 375 kPa to 410 kPa. Portions of the reaction mixture were analyzed by gas chromatography at various time intervals. The formation rate of the 5,6,7,8-tetrahydro working compound ($H_4AAQ$) is shown in Table 1. Liquid chromatographic analysis of the final product showed no other quinone related by-products.

EXAMPLE 4

$H_4AAQ$ was also prepared in a conventional process pilot employing 90-95% recycle to the fixed-bed hydrogenator to simulate a plant start-up. The initial solution consisted of 22 liters of 15% 2-amylanthraquinone (AAQ) and in the DIBC-SSol mixed solvent. The solution was subjected to hydrogenation (15 cm fixed-bed catalyst), oxidation, and extraction in the process pilot The following pilot conditions were observed:

| | |
|---|---|
| Hydrogenator Inlet Temperature | 40-45° C. |
| Hydrogenator Inlet Pressure | 375-410 kPa |
| Oxidizer Temperature | 40-42° C. |
| Oxidizer Pressure | 210-245 kPa |
| Extractor Temperature | 25-30° C. |

| | |
|---|---|
| Total Flow to Hydrogenator (Including Recycle) | 600 ml/minute |
| Recycle Flow to Hydrogenator | 540 ml/minute |
| Flow to Oxidizer | 60 ml/minute |

The formation rate of $H_4AAQ$ is shown in Table 2. Gas and liquid chromatography analyses showed no other quinone by-products.

EXAMPLE 5

Example 1 was repeated with a solution containing approximately 4.5% EAQ and operated at 40° C. and 375 kPa. The results are presented in Table 3.

EXAMPLE 6

Example 5 was repeated with a solution containing approximately 15% AAQ in a DIBC-SSol solvent using 200 g catalyst. The results are presented in Table 4.

Pursuant to the requirements of the patent statutes, the principle of this invention has been explained and exemplified in a manner so that it can be readily practiced by those skilled in the art, such exemplification, including what is considereo to represent the best embodiment of the invention. However, it should be clearly understood that, with the scope of the appended claims, the invention may be practiced by those skilled in the art, and having the benefit of this disclosure, otherwise than as specifically described and exemplified herein.

TABLE 1 (EXAMPLE 3)

TABLE 1

(Example 3)
Rate of Formation of the Tetrahydro Compound

| Time Hours | % AAQ | % $H_4AAQ$ |
|---|---|---|
| 0 | 16.0 | 0.0 |
| 2 | | 1.2 |
| 4 | | 3.0 |
| 6 | | 4.5 |
| 8 | | 5.8 |
| 10 | | 6.7 |
| 14 | | 10.5 |
| 20 | | 14.1 |
| 22 | | 15.0 |
| 24 | | 15.7 |
| 26 | | 15.8 |

TABLE 2 (EXAMPLE 4)

TABLE 2

(Example 4)
Rate of Formation of the Tetrahydro Compound

| Time Hours | % AAQ | % $H_4AAQ$ |
|---|---|---|
| 0 | 15.0 | 0.0 |
| 8 | | 3.0 |
| 24 | | 3.8 |
| 32 | | 4.8 |
| 52 | | 7.4 |
| 56 | | 7.8 |
| 60 | | 8.2 |

TABLE 3 (EXAMPLE 5)

TABLE 3

| | (Example 5) Rate of Formation of the Tetrahydro Compound | |
|---|---|---|
| Time Hours | % EAQ | % H₄EAQ |
| 0 | 4.5,4.3 | 0.0 |
| 5 | 3.19 | 1.15 |
| 8 | 2.62 | 1.79 |
| 12 | 1.99 | 2.44 |
| 16 | 1.41 | 2.91 |

TABLE 4 (EXAMPLE 6)

TABLE 4

| | (Example 6) Rate of Formation of the Tetrahydro Compound | |
|---|---|---|
| Time Hours | % AAQ | % H₄AAQ |
| 0 | 14.6,14.6 | 0.0 |
| 4 | 12.8 | 1.8 |
| 11 | 9.7 | 4.6 |

We claim:

1. In a process for producing hydrogen peroxide by the cyclic steps of reducing, oxidizing, and extracting a working solution containing as a working compound an alkylated anthraquinone and the corresponding hydroquinone, tetrahydroanthraquinone and tetrahydroanthrahydroquinone, the improvement which comprises increasing the mol ratio of the nuclearly-hydrogenated, tetrahydro components of the working compound in the working solution by adjusting the concentration of the non-nuclearly hydrogenated working compounds to be equal to, or less than, the maximum solubility of the alkylated anthrahydroquinone formed in the working solution at the hydrogenation temperature, hydrogenating the working solution in the presence of a palladium catalyst at a pressure of 50 to 400 kilopascals at a temperature of 50° C. or less and recycling at least 90 percent of the hydrogenated working solution to the hydrogenator without oxidation and extraction thereby increasing the mol ratio of the tetrahydro components of the working compound without forming substantial quantities of undesirable by-products.

2. The process of claim 1 wherein the alkylated anthraquinone is selected from the group consisting of 2-ethylanthraquinone, 2-isobutylanthraquinone, and 2-amylanthraquinone.

3. The process of claim 1 wherein the pressure is between 100 and 200 kilopascals.

4. The process of claim 1 wherein the hydrogenation temperature is between 40° C. and 50° C.

5. The process of claim 3 wherein the alkylated anthraquinone is selected from the group consisting of 2-ethylanthraquinone, 2-isobutylanthraquinone, and 2-amylanthraquinone.

6. The process of claim 4 wherein the alkylated anthraquinone is selected from the group consisting of 2-ethylanthraquinone, 2-isobutylanthraquinone, and 2-amylanthraquinone.

7. The process of claim 1 wherein at least 95% of the hydrogenated working solution is recycled to the hydrogenator.

8. The process of claim 7 wherein the alkylated anthraquinone is selected from the group consisting of 2-ethylanthraquinone, 2-isobutylanthraquinone, and 2-amylanthraquinone.

9. The process of claim 7 wherein the pressure is between 100 and 200 kilopascals.

10. The process of claim 7 wherein the hydrogenation temperature is between 40° C. and 50° C.

11. The process of claim 9 wherein the alkylated anthraquinone is selected from the group consisting of 2-ethylanthraquinone, 2-isobutylanthraquinone, and 2-amylanthraquinone.

12. The process of claim 10 wherein the pressure is between 100 and 200 kilopascals.

13. In a process for producing hydrogen peroxide by the cyclic steps of reducing, oxidizing, and extracting a working solution containing as a working compound, a compound selected from the group consisting of 2-ethylanthraquinone, 2-isobutylanthraquinone, 2-amylanthraquinone, the corresponding 2-alkylanthrahydroquinone, the corresponding 5,6,7,8-tetrahydro-2-alkylanthraquinone, and the corresponding 5,6,7,8-tetrahydro-2-alkylanthrahydroquinone, the improvement which comprises increasing the mol ratio of the nuclearly-hydrogenated, tetrahydro components of the working solution by adjusting the concentration of the non-nuclearly hydrogenated working compounds to be equal to or less than the maximum solubility of the alkylated anthrahydroquinone formed in the working solution at the hydrogenation temperature, hydrogenating the working solution at a pressure of 100 to 400 kilopascals, at a temperature of 40° C. to 50° C., and recycling at least 90% of the working solution to the hydrogenator without oxidation and extraction thereby increasing the mol ratio of the tetrahydro components of the working compound without forming substantial quantities of undesired by-products.

14. A process for starting up a plant for producing hydrogen peroxide by the cyclic steps of reducing, oxidizing, and extracting a working solution containing as a working compound an alkylated anthraquinone, and the corresponding anthrahydroquinone, tetrahydroanthraquinone, and tetrahydroanthrahydroquinone comprising the steps of adjusting the concentration of the non-nuclearly hydrogenated working compounds in the working solution to be equal to, or less than, the maximum solubility of the alkylated anthrahydroquinone formed in the working solution at the hydrogenation temperature, hydrogenating the working solution in the presence of a palladium catalyst at a pressure of 50 to 400 kilopascals and at a temperature of 50° C. or less, and recycling at least 90% of the hydrogenator without the steps of oxidation and extraction, thereby increasing the mol ratio of tetrahydro components of the working compound without forming substantial quantitites of undesired by-products.

15. The process of claim 14 wherein the adjusting step is repeated at least once after the hydrogenation step.

16. The process of claim 14 wherein the alkylated anthraquinone is selected from the group consisting of 2-ethylanthraquinone, 2-isobutylanthraquinone, and 2-amylanthraquinone.

17. The process of claim 14 wherein the hydrogenation pressure is 100 to 200 kilopascals and the hydrogenation temperature is 40° C. to 50° C.

18. The process of claim 15 wherein the alkylated anthraquinone is selected from the group consisting of 2-ethylanthraquinone, 2-isobutylanthraquinone, and 2-amylanthraquinone.

19. The process of claim 15 wherein the hydrogenation pressure is 100 to 200 kilopascals and the hydrogenation temperature is 40° C. to 50° C.

20. The process of claim 18 wherein the hydrogenation pressure is 100 to 200 kilopascals and the hydrogenation temperature is 40° C. to 50° C.

* * * * *